Aug. 24, 1937.  H. C. LIMBACH  2,091,077
LAWN MOWER
Filed July 12, 1934   7 Sheets-Sheet 5
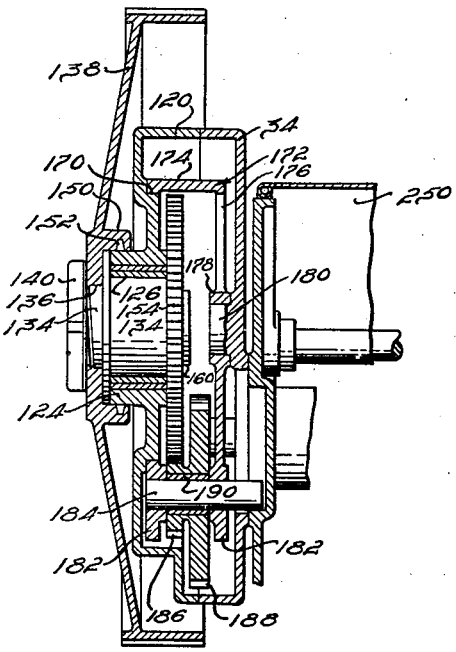
FIG. 9.
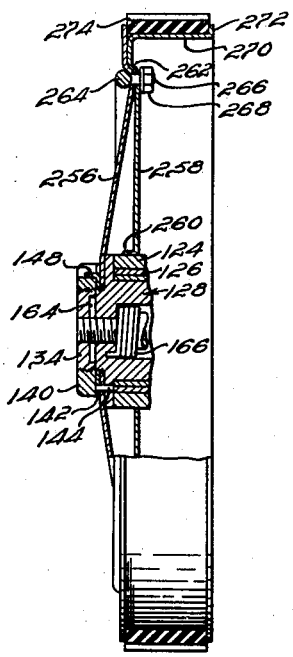
FIG. 10.
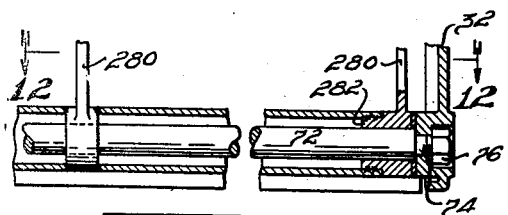
FIG. 11.
FIG. 12.
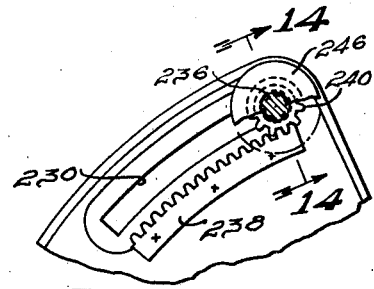
FIG. 13.
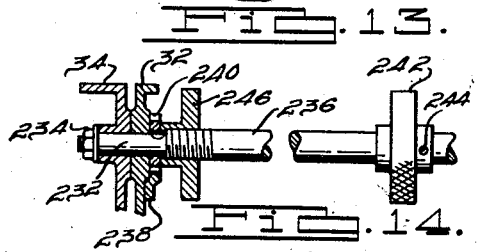
FIG. 14.
INVENTOR.
Henry C. Limbach.
BY
Harness, Dickey, Pierce & Hann.
ATTORNEYS.

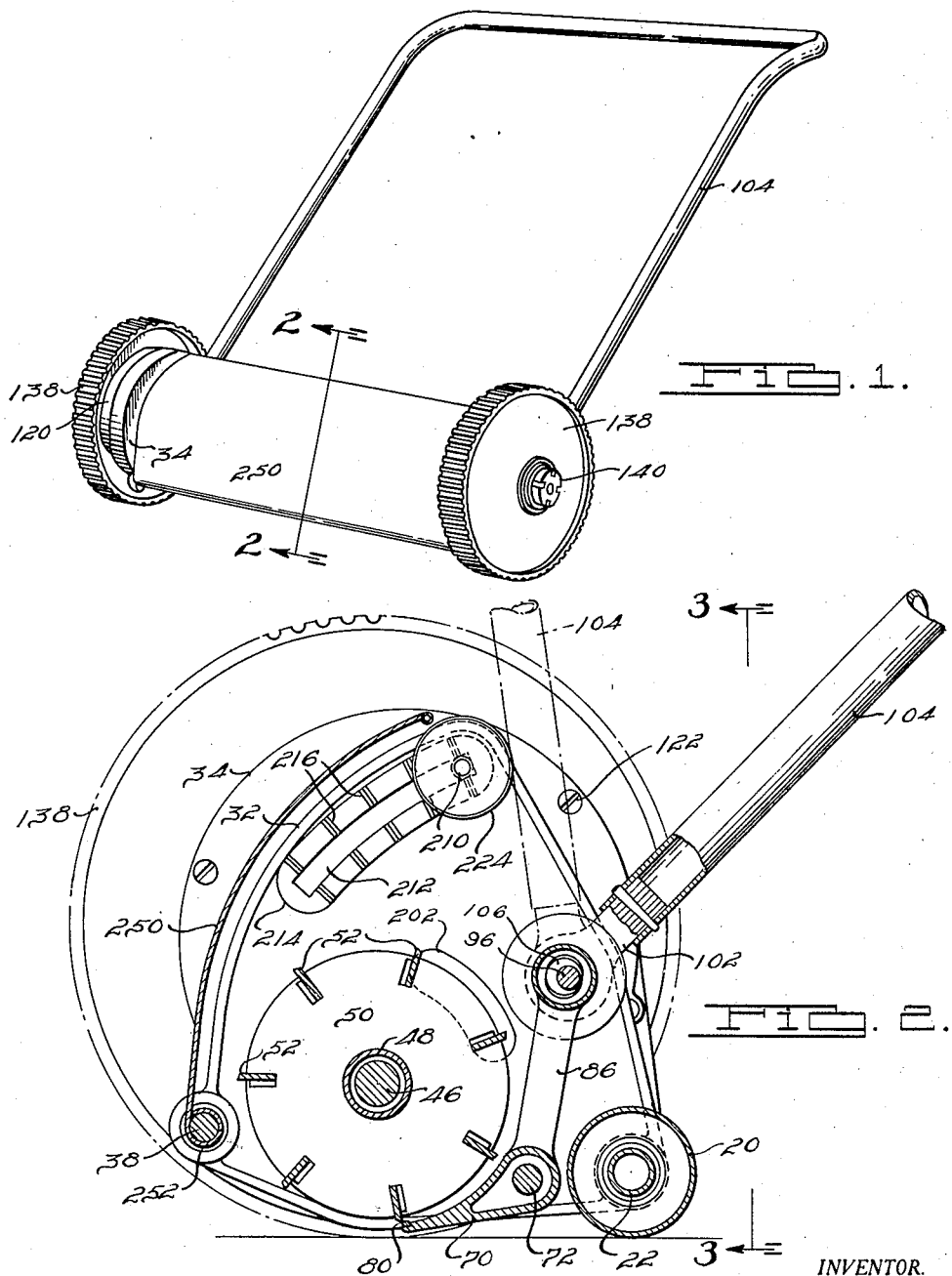

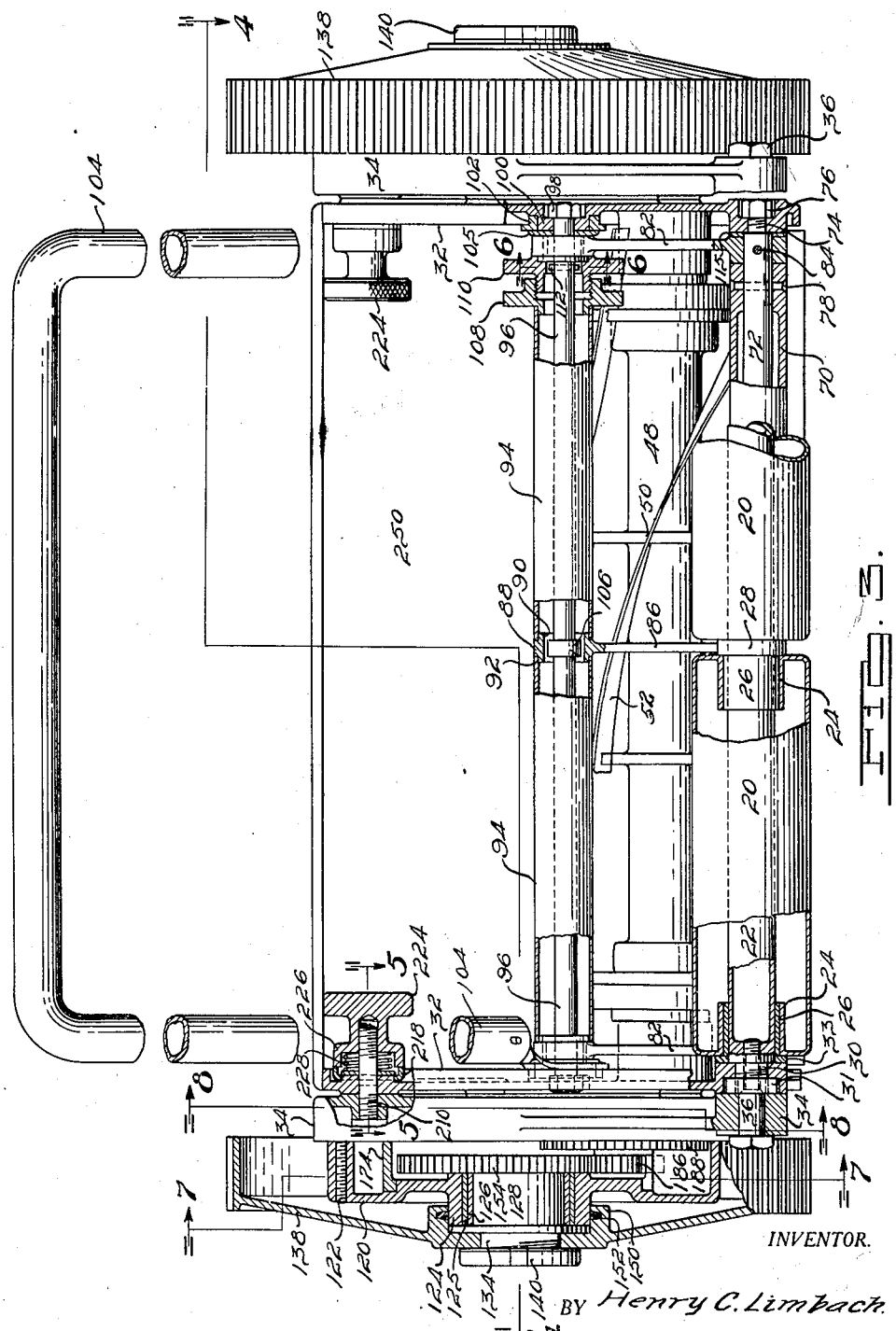

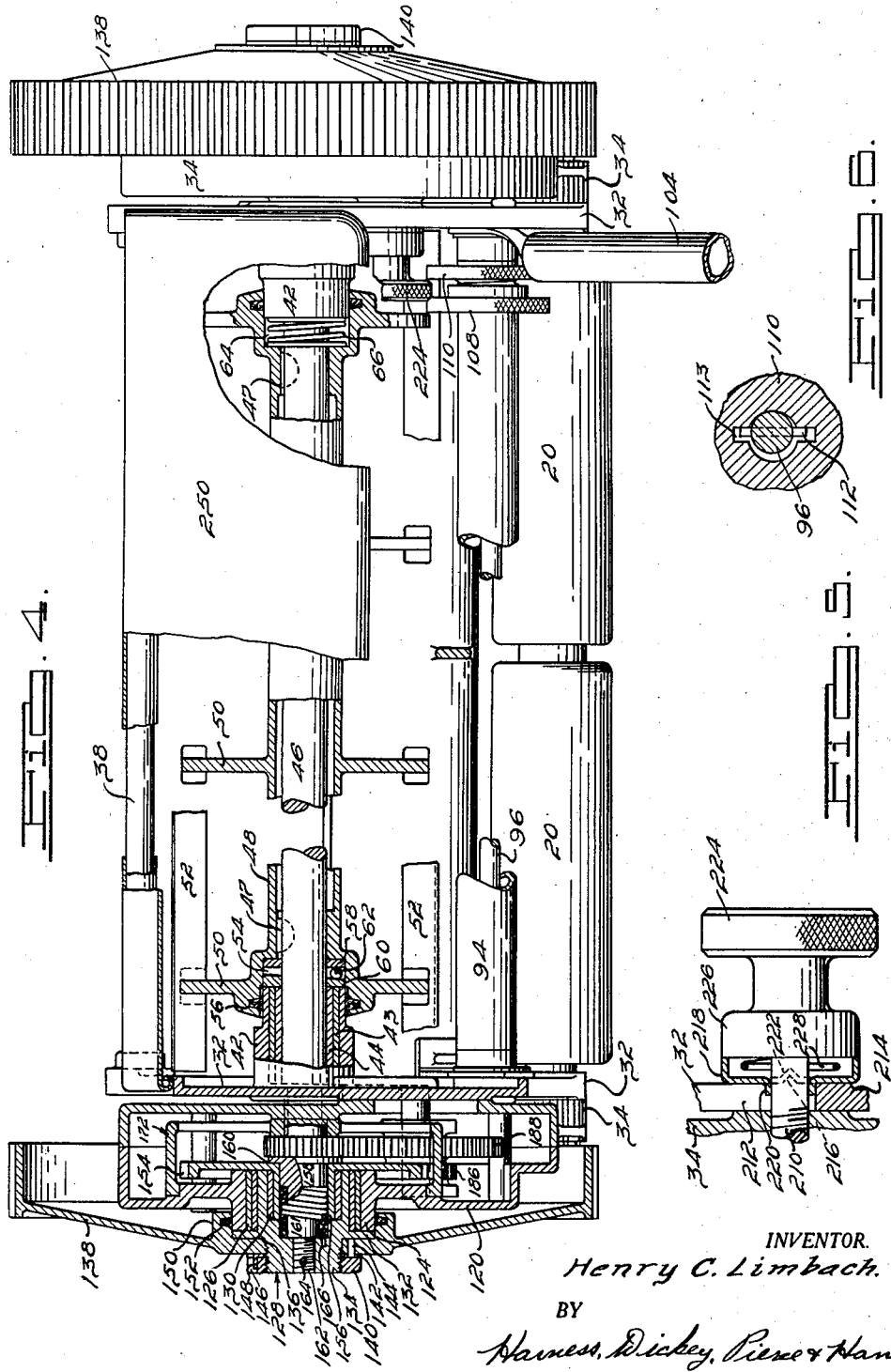

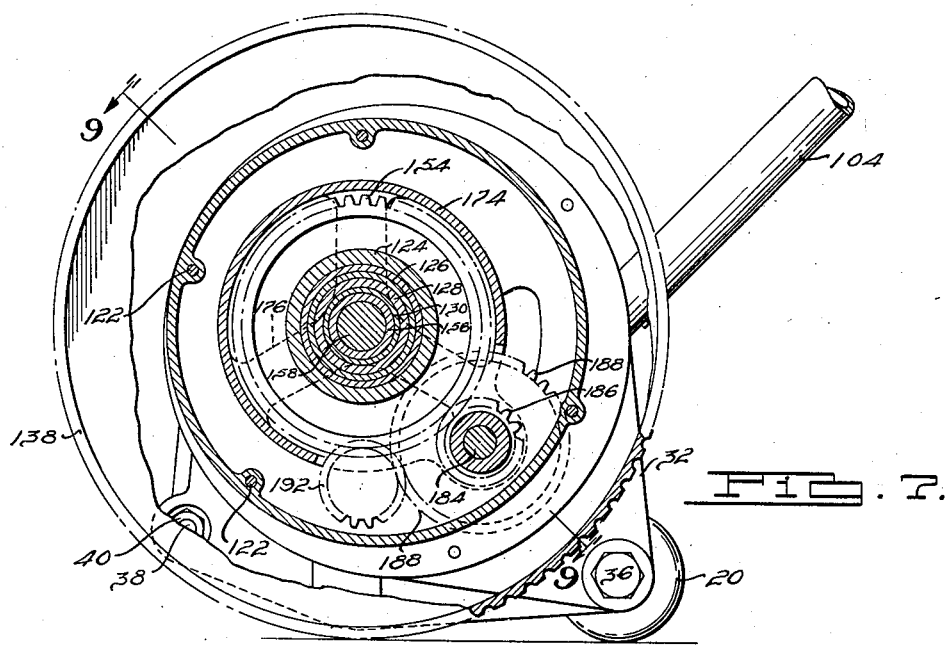
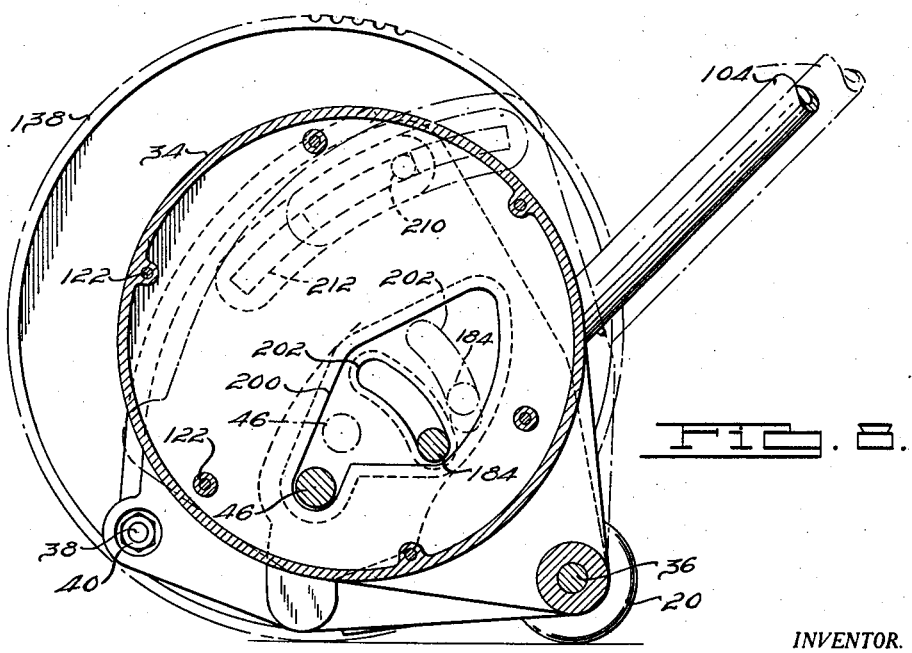

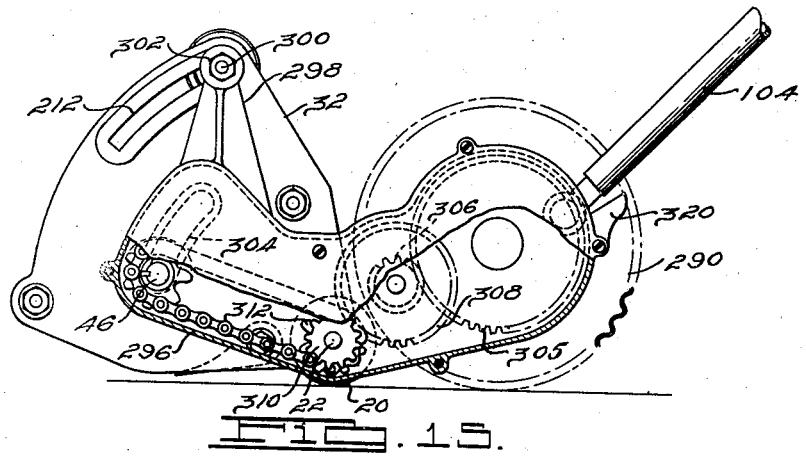
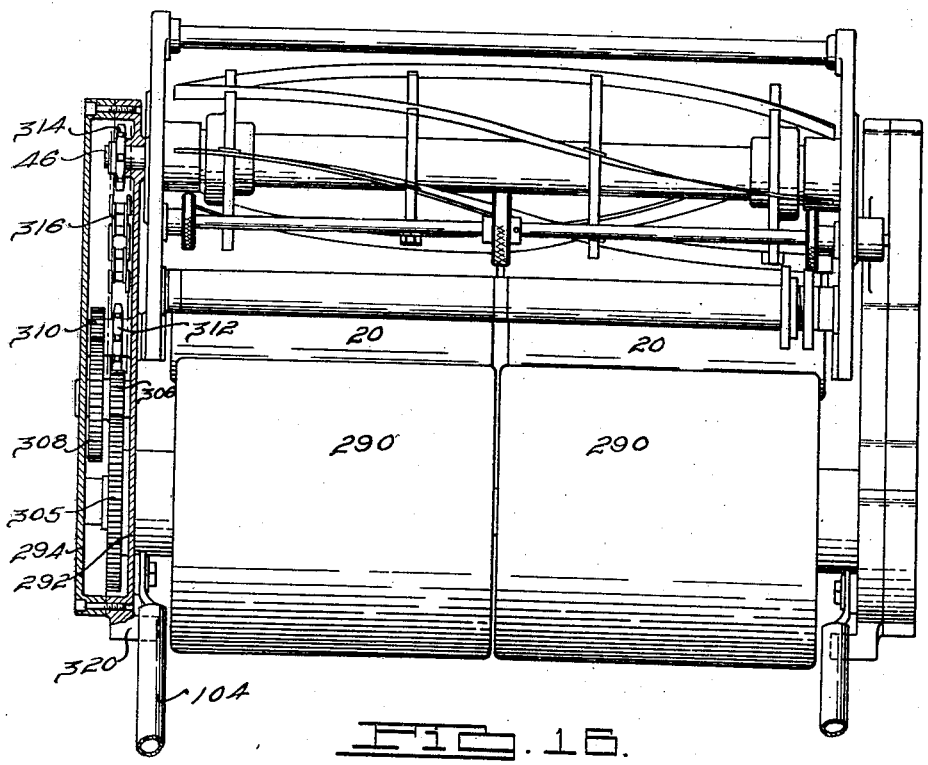

Aug. 24, 1937.   H. C. LIMBACH   2,091,077
LAWN MOWER
Filed July 12, 1934   7 Sheets-Sheet 7
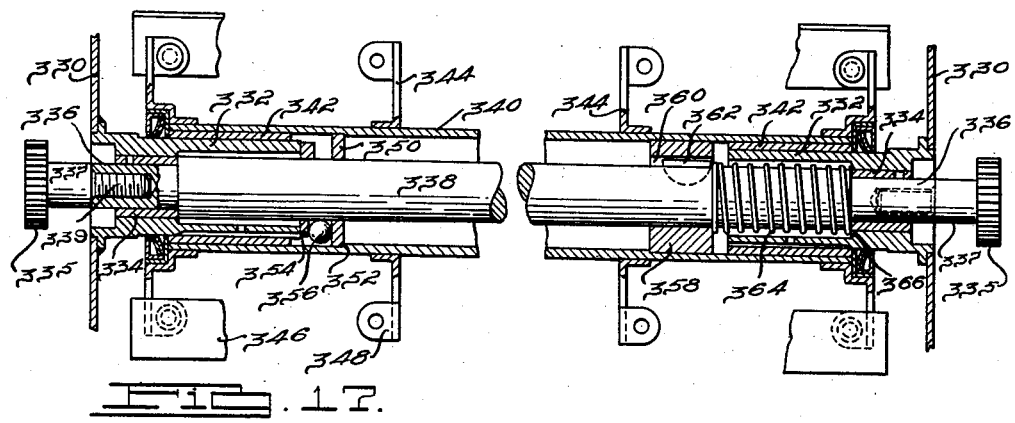
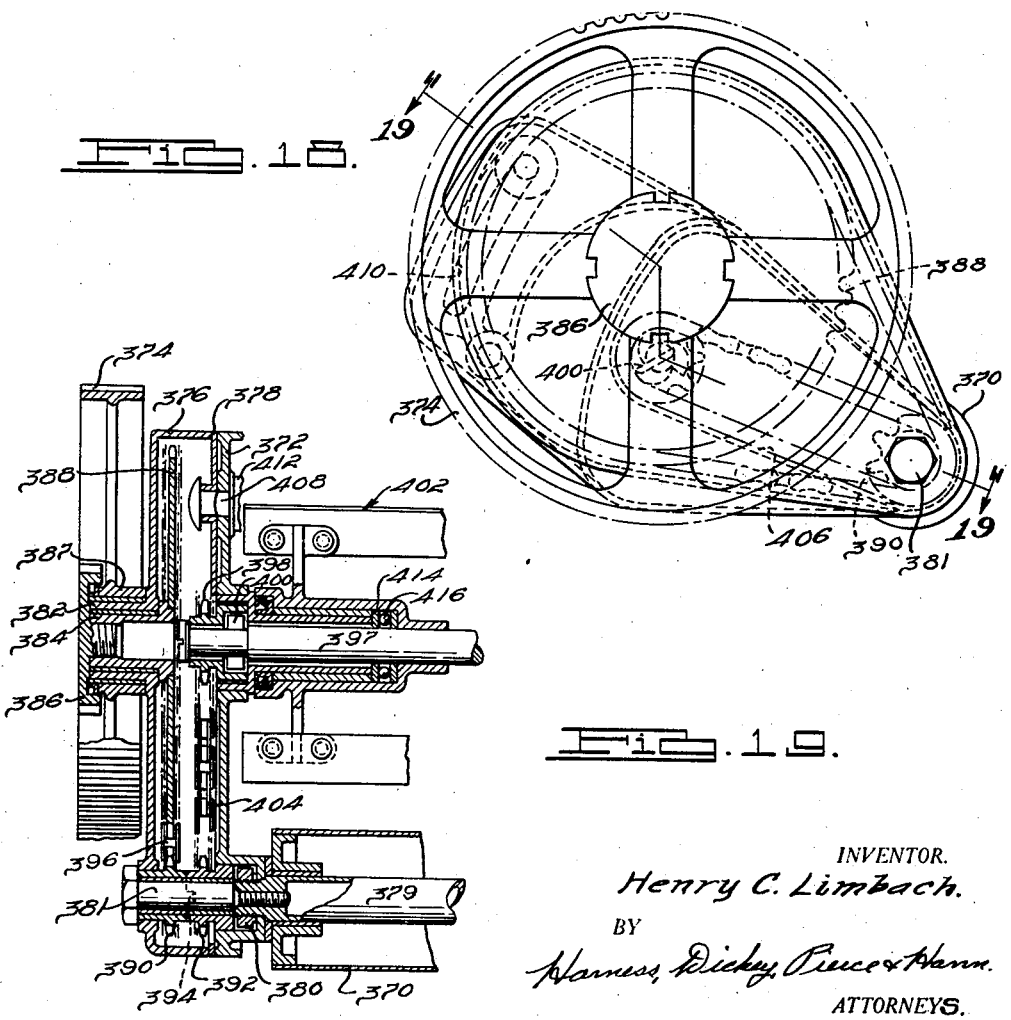
INVENTOR.
Henry C. Limbach.
BY
ATTORNEYS.

Patented Aug. 24, 1937

2,091,077

UNITED STATES PATENT OFFICE 2,091,077

LAWN MOWER

Henry C. Limbach, Detroit, Mich., assignor to Product Development Quest, Inc., a corporation of Michigan Application July 12, 1934, Serial No. 734,769

44 Claims. (Cl. 56—253)

This invention relates to lawn mowers and has for its principal object the provision of a lawn mower of improved operating and wearing characteristics, and of added usefulness as compared to conventional constructions.

Objects of the invention include the provision of a lawn mower in which the line of contact between the cutter blades and the cutter bar is in approximate vertical alignment with the axis of the driving wheels and consequently with the line of contact between the driving wheels and the surface upon which the lawn mower is supported; the provision of a construction as above described in which the cutter and cutter bar assembly is shiftable in a vertical direction to vary the height of cut thereby without materially affecting the approximately vertically aligned relation between the cutting edge of the cutter bar and the line of contact of the wheel and the ground; the provision of a lawn mower having driving wheels and a supporting roller including a chassis frame pivotally mounted with respect to the axis of the roller and carrying the cutter reel and bar, the wheels being independently pivotally mounted with respect to the axis of the roller and being separately adjustable relative thereto without affecting their driving connection with the cutter reel; the provision of a construction as above described in which one of the driving wheels may be removed or may be adjusted independently of the other wheel without materially affecting the cutting ability of the lawn mower; the provision of a lawn mower in which the cutter reel and wheels are bodily shiftable relative to one another to vary the height of cut including a novel form of driving mechanism interconnecting the wheels and cutter reel to permit such bodily shifting of the reel with respect to the wheels without affecting the driving connection between them; and the provision of a novel lawn mower construction permitting vertical bodily shiftable movement of the cutter reel and cutter bar assembly with respect to the driving wheel without affecting the driving relation between them, and means for easily and quickly locking the parts in their adjusted positions.

Other objects of the invention include the provision of a lawn mower having a cutter reel and cutter bar and means for causing relative movement between the cutter reel and cutter bar during operation of the lawn mower in a direction axially of the cutter reel whereby to obtain a more perfect cutting action thereby and whereby to obtain a self-sharpening action between the blades of the cutter reel and the cutter bar; and the provision of a lawn mower having a cutter reel provided with an annular cam associated with one end thereof, the cutting action of the mower constantly urging said cutter reel axially in a direction opposed to the direction of actuation of the cam means.

Other objects of the invention include the provision of a lawn mower having a novel form of mechanism for adjusting and locking the cutter bar in place; the provision of a lawn mower having a single means of adjustably moving the entire cutter bar with respect to the cutter reel; the provision of a lawn mower having a pivotally mounted cutter bar and a plurality of arms longitudinally spaced with respect thereto, cam means associated with each of the arms and a common means for simultaneously adjusting the cam means with respect to the arms; and the provision of a simple and effective locking means for locking the above mentioned cams in their adjusted position.

Other objects of the present invention include the provision of a lawn mower having a novel form of chassis construction; the provision of a lawn mower having a chassis bodily shiftable independently of the driving wheels, and having a novel form of means for connecting the chassis and driving wheels, and the provision of a lawn mower having a relatively short and constant wheel base.

Other objects include the provision of a lawn mower having a novel form of chain drive between the driving wheels and the cutter reel; and the provision of a lawn mower including a chassis and driving wheels bodily movable relative to one another about an axis eccentric to the axes of both, the wheels and cutter reel being provided with axially concentric sprockets each connected by a chain to a sprocket mounted concentrically with respect to said eccentric axis.

Other objects are the provision of a novel form of cutter reel for lawn mowers; and the provision of a lawn mower provided with a cutter reel and a shaft for driving the cutter reel, the shaft and cutter reel being independently rotatably supported upon the side frame members of said mower.

Other objects of the invention include the provision of a lawn mower provided with a handle so constructed and arranged as to permit the handle to be moved so as to position its center of gravity forwardly of its axis of mounting when not in use and thereby to automatically retain it in such position.

Other objects are to provide a lawn mower having a replaceable wheel tread; the provision of a lawn mower driving wheel construction of novel design; the provision of a novel connection between the driving wheel and the cutter reel of a lawn mower including a novel form of overrunning clutch mechanism; the provision of a novel guard means for cutter reel of a lawn mower; the provision of a cutter bar for a lawn mower in which the cutting edge is formed of a special material highly resistant to wear; the provision of a lawn mower cutter bar of novel construction; the provision of a novel means for shielding the ends of a cutter reel from becoming wrapped by long grass; and the provision of a lawn mower structure in which the driving wheels are positioned to the rear of the cutter bar and usual roller and provided with a novel form of drive to the cutter reel.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a perspective front quarter view of my improved lawn mower.

Fig. 2 is an enlarged vertical sectional view taken transversely through the axis of the lawn mower as on the line 2—2 of Fig. 1.

Fig. 3 is a partially broken, partially sectioned view of the lawn mower on the same scale as in Fig. 2 looking from the rear thereof as on the line 3—3 of Fig. 2.

Fig. 4 is a partially broken, partially sectioned plan view of the lawn mower taken on the line 4—4 of Fig. 3.

Fig. 5 is an enlarged partially sectioned view taken on the line 5—5 of Fig. 3 and illustrating in greater detail the construction employed for adjustably locking the chassis and wheel mechanism together.

Fig. 6 is an enlarged, fragmentary, sectional view taken on the line 6—6 of Fig. 3.

Fig. 7 is a partially broken, vertical sectional view taken on the line 7—7 of Fig. 3.

Fig. 8 is a vertical sectional view taken on the line 8—8 of Fig. 3.

Fig. 9 is a transverse sectional view taken axially through one of the driving wheels as on the line 9—9 of Fig. 7.

Fig. 10 is a vertical sectional view taken axially through a modified form of driving wheel construction.

Fig. 11 is a fragmentary sectional view taken centrally through a modified form of cutter bar construction and illustrating the manner of supporting an end of the same in one of the chassis side frame members.

Fig. 12 is a fragmentary plan view of the construction shown in Fig. 11, taken as on the line 12—12 of Fig. 11.

Fig. 13 is a fragmentary view showing a modified form of construction by means of which both driving wheels may be simultaneously adjusted with respect to the chassis assembly and locked in such adjusted position.

Fig. 14 is a sectional view taken on the line 14—14 of Fig. 13.

Fig. 15 is a partially broken side elevational view of a modified form of construction particularly intended for use on putting greens of bent grass or for similar uses.

Fig. 16 is a partially broken, enlarged top plan view of the construction shown in Fig. 15.

Fig. 17 is a fragmentary, partially broken sectional view taken axially through a modified form of cutter reel and shaft construction showing a modified manner of mounting the same.

Fig. 18 is a side view of a modified form of construction employing a chain drive.

Fig. 19 is a fragmentary partially broken sectional view taken on the line 19—19 of Fig. 18.

The present invention involves a lawn mower structure in which the cutter reel is adjustable relative to the axes of the driving wheels and an important feature of the invention is the provision of a lawn mower involving a supporting roller which, according to the present invention, is employed as a fulcrum roll about the axis of which the driving wheels and the cutter reel are adjustable relative to one another, and which supporting roller forms the main weight supporting element of the structure, the driving wheels sustaining only sufficient weight to insure traction. To attain a structure in which this is possible I provide what I prefer to term a chassis for the lawn mower including side frame members having a pivotal relation with respect to the fulcrum roll, suitably secured together and supporting between them the cutter reel and cutter bar. The driving wheels themselves are secured relative to the axis of the fulcrum roll so that in effect the chassis and the driving wheels are angularly movable with respect to each other about the axis of the fulcrum roll. A novel form of driving mechanism is provided between the driving wheels and the cutter reel permitting adjustment between these parts without affecting the operability of the drive in any respect whatever. Various other features of novelty are incorporated in the preferred form of structure but these will be brought out in detail in the following description.

Referring now to the accompanying drawings and particularly to Fig. 3, it will be noted that the fulcrum roll is preferably made up of one or more rollers 20 suitably mounted upon a shaft 22. In the present instance the rollers 20 are shown as formed of sheet metal and provided with central inwardly directed sleeves 24 at their opposite ends in each of which is received a suitable bushing 26 for rotatably receiving the shaft 22. Where more than one roller 20 is employed as in the embodiment shown, a spacer 28 is preferably provided on the shaft 22 between adjacent ends of adjacent rollers 20 so as to maintain them in suitably spaced and non-rubbing relation.

The outer ends of the shaft 22 are reduced in diameter as at 30 for receiving thereon one corner portion of the corresponding triangularly shaped side frame chassis members 32, it being understood that the chassis members 32 are identical in construction except that they are right and left hand. Preferably a spacer 33 is interposed between the outer ends of the rollers 20 and the frame side members 32.

The outer face of each side frame member 32 surrounding the corresponding reduced end 30 of the shaft 22 is recessed on its outer face for reception of a nut member 31 which is threaded onto the outer end of each portion 30 so as to draw the shoulder formed at the junction of the portion 30 with the main body of the shaft 22 tightly up against the inner face of the corresponding side frame member 32. The shaft 22 is thus caused to form a rigid tie bar between opposite side frame members 32 and aids in making the chassis construction more rigid. A gear casing member 34, which will hereinafter be described in greater detail, abuts against the outer face of each frame side member 32 and is pivotally secured relative thereto by means of a shouldered stud 36 which is threaded into the corresponding end of the shaft 22 axially thereof. The shoulder on the stud 36 in engaging the corresponding outer end of the shaft 22 insures the proper degree of clearance between the head of the stud 36 and the corresponding member 32 to permit the required pivotal movement of the member 34 and yet prevent looseness in the connection between them.

As particularly noted in Figs. 2 and 4, a tie bar 38 is extended between the front corners of the chassis frame side members 32 and is rigidly secured thereto as by nuts 40 (see Figs. 7 and 8). Thus the shaft 22 and tie bar 38, together with the cutter blade adjusting mechanism which will hereinafter be described in detail, rigidly secure the chassis frame side members 32 together in spaced relation to form a chassis for the cutter reel, cutter bar and other elements of the mower.

As best illustrated in Fig. 4, each chassis frame side member 32 is provided with an inwardly extending sleeve-like boss 42 within which is preferably received an outer bearing liner 43 in which a bearing 44 is in turn received, and while in the broader aspects of the present invention this bearing construction may be of any suitable or improved type, the particular type shown is of the type commonly known as a floating sleeve bearing in which the member 44 is rotatable both in the liner 43 and about the shaft which is received in it. This type of bearing insures against frequent adjustment, against localized wear, and contributes toward maintaining proper alignment of the supported parts. Extending between and rotatably supported in the bearings 44 is the shaft 46 of the cutter reel which comprises an elongated hub portion 48 keyed to the shaft 46 by suitable keys 47 fixed against movement axially of the shaft 46 and relative to which the hub 48 of the cutter reel is slidable, permitting relative axial sliding movement between them and having a plurality of axially spaced discs or spiders 50 about the peripheries of which are suitably grouped and secured a plurality of cutters 52. The ends of the hub portion 48 are enlarged to form axially concentric pockets 54 therein within the outer end of each of which the corresponding inner end of the bearing boss 42 is received and a suitable packing member 56 is provided between the opposed walls of the sleeve 42 and pocket 54 to prevent the entrance of dirt and dust or other foreign matter to the bearings 44 and to serve as an oil retainer.

Again referring to Fig. 4, it will be noted that in the left hand pocket 54 a ring 58 of hard metal surrounds the shaft 46 in the bottom of the pocket and a ring member 60 also surrounds the shaft 46 in the pocket 54 and is secured against rotation to the end of the corresponding sleeve 42. The ring 60 is of non-uniform thickness, preferably thin at one side and gradually increasing in thickness toward the diametrically opposite side, thus forming a cam. A ball 62 is interposed between the ring 58 and the cam 60.

The opposite end of the hub 48 is provided with a pocket 64 similar to the pocket 54 and within the pocket 64 is a coil spring 66 maintained under axial compression between the bottom of the pocket 64 and the corresponding end of the corresponding sleeve-like boss 42. With this construction it will be apparent that the spring 66 will normally urge the cutter reel to the left, as viewed in Fig. 4, so as to assist the thrust of the cutting action on the reel in causing the ball 62 to be frictionally gripped between the ring 58 and cam 60. As the cutter reel rotates the ball 62 will be caused to roll around the shaft 46 between the ring 58 and cam 60 and at half the speed of the cutter reel, and in rolling it will climb up and down the surface of the cam 60 and will force the entire cutter reel assembly toward the right, as viewed in Fig. 4, while the ball is climbing toward the high point of the cam 60 and after passing over the high point of the cam 60 the thrust of the cutting action of the mower will cause the cutter reel to move to the left until the ball 62 reaches the low point of the cam 60. By this means, as the cutter reel is rotated during operation of the lawn mower it is caused to have a bodily axial shifting movement first in one direction and then the other. This axial movement of the cutter reel not only enhances the cutting effect of the lawn mower in that a more nearly true shaving effect on the grass being cut thereby is obtained, but the cutters in contacting with the cutter bar and having both axial and transverse movement with respect to the cutter bar will have a self-sharpening effect on both the blades and the cutter bar. Also, it will be apparent that each point on the cutting edge of the cutters 52 will be brought into contact with different points on the cutter bar during operation of the lawn mower and thus act to evenly distribute the wear between them rather than to localize it as in conventional constructions where the same points on the cutter contact with the same points on the cutter bar during each revolution of the cutting reel.

As best viewed in Figs. 2 and 3, a cutter bar 70 is mounted upon a shaft 72 provided with reduced ends 74 rotatably received in the opposite side frame members 32 and maintained against axial movement with respect thereto by cooperating nuts 76 preferably pocketed in the side members 32 as illustrated in Fig. 3. The cutter bar 70 is fixed to the shaft 72 as by means of pins 78. As best illustrated in Fig. 2, the cutting edge 80 of the cutter bar 70 is located below and in slightly rearwardly spaced relation with respect to the axis of the shaft 46 for the cutting reel. The tip 80 is preferably formed from a piece of high speed or other alloy steel or other suitable material of hard and tough nature which will readily resist wear and maintain its sharpness, and may be secured in place by welding, brazing, or the like.

An arm 82 is received on each end of the shaft 72 between the corresponding frame side member 32 and the corresponding end of the cutter bar 70 and is secured against rotation on the shaft 72 by means of a pin 84. A third arm 86 located midway between the arms 82 may be formed integrally with or welded to the cutter bar 70. The arms 82 and 86 extend upwardly from the cutter bar 70 and at their upper ends each is provided with a head 88 provided with an opening 90 therein, the openings 90 being axially aligned with each other. Opposed faces of the heads 88 are shouldered as at 92 for piloting and forming abutments for tubes 94 which extend between the left hand arm 82 and arm 86 and between the arm 86 and adjusting and locking mechanism provided in conjunction with the right hand arm 82 and which will be described in detail later. Extending through the tubes 94 and openings 90 and between opposite frame side members 32 is a shaft 96 the ends of which are rotatably received in the frame side members 32 and cooperate with nuts 98 to further serve to tie the frame side members 32 against separation with respect to each other.

It might be noted at this point that the frame side members 32 at their point of reception of the ends of the shaft 96 are each provided with an inwardly extending boss 100 concentric with the axis of the shaft 96 and upon which bosses 100 the inner end members 102 of the handle 104 for the lawn mower are journaled. A washer 105 surrounding the shaft 96 between each boss 100 and the head of the adjacent arm 82 serves to maintain the ends 102 against axial displacement on the bosses 100.

As best illustrated in Figs. 2 and 3, the shaft 96 has an eccentric 106 fixed thereto within each of the openings 90 of the head 88 and arranged for engagement with the walls of the openings 90. As best illustrated in Fig. 3, the right hand end of the right hand tube 94 instead of being piloted directly upon the corresponding head 88 of the corresponding arm 82, is piloted upon a nut member 108 surrounding the shaft 96 in freely spaced relation thereto. Another member 110 surrounds the shaft 96 between the nut member 108 and the right hand arm 82 as viewed in Fig. 3 and is piloted directly upon the shoulder 92 of the head 88 of the right hand arm 82. The member 110 is formed for threaded engagement with the nut member 108 and is also fixed for equal rotation with the shaft 96 by means of a suitable pin 112. As indicated in Fig. 6, the shaft 96 has ample clearance in the member 110 and the pin 112 has ample clearance in the slots 113 provided for it so as to permit the necessary bodily shifting movement between these parts in the adjustment of the cutter bar. As illustrated in Fig. 4, the exterior surfaces of the members 108 and 110 are knurled to facilitate manual engagement and operation thereof.

With the above described construction it will be apparent that the axes of the shafts 72 and 96 being fixed with respect to the side frame members 32, rotation of the shaft 96 will cause the eccentrics 106 to bear against the walls of the corresponding openings 90 and cause all of the arms 82 and 86 to be rocked about the axis of the shaft 72 accordingly. As the shaft 72 is thus caused to rock about its axis through movement of the upper ends of the arms 82 and 86, the cutting edge 80 of the cutter bar 70 will be caused to be moved vertically so as to alter its relation with respect to the path of travel of the cutting edges of the cutters 52. In this manner the clearance between the cutters and the cutter bar is controlled. In view of the fact that rotation of the member 110 will cause equal rotation of the shaft 96, it provides a means whereby a single member is operable to simultaneously and positively control the clearance between the cutter bar and cutters over the full length of the cutter bar. In order to hold the cutter bar assembly against inadvertent movement during adjustment as above described, a spring washer 115 is placed around the shaft 72 between each frame side member 32 and the adjacent levers 82, the parts being so proportioned as to place the washers 115 under compression and effect a frictional thrust means.

In thus adjusting the cutter bar 70 in order to vary the clearance between its cutting edge 80 and the cutters 52, the nut 108 is threaded upon the member 110 so as to move it axially toward the member 110. The member 110 is then grasped by the hand and rotated until the desired clearance between the cutter bar and the cutters is obtained and then while the member 110 is maintained against rotation the nut member 108 is threaded so as to move it axially away from the member 110. This movement of the nut member 108 also tends to move the tubes 94 to the left away from the member 110 and thereby acts to force the heads 88 of the arms 82 axially of the shaft 96 away from each other and into end clamping engagement with the frame side members 32 through the washers 105. This effectively locks the member 110 and consequently the shaft 96 and cutter bar 70 against inadvertent displacement once the clearance has been adjusted between the cutter bar and the cutter reel.

Referring now to Figs. 3 and 4 and particularly the latter figure, it will be noted that the gear housing members 34 which, as previously described, are mounted for pivotal movement with respect to the axis of the shaft 22 independently of the side frame members 32 are of cup-shaped formation and open axially outwardly with respect to the corresponding wheel. Cooperating with each of the gear housing members 34 is a companion housing member 120 of generally cup-shaped formation and opening axially inwardly with respect to the corresponding driving wheel, the outer edges of the housings 34 and 120 matching each other and the housings being secured together by means of screws 122. Each housing member 120 is centrally formed to provide a hub 124 within which is preferably received a suitable liner 125, within which, in turn, is rotatably received a bearing 126. Although this bearing construction may be of any suitable type, it is here shown as the floating sleeve type previously described. Rotatably received within each bearing 126 is a wheel hub member indicated generally at 128 and the axial line of which, as will be noted, is approximately vertically aligned with the cutting edge 80 of the cutter bar 70 when the various parts of the mower are in the position indicated in Fig. 2. As illustrated in Fig. 4, the inner end of the hub 128 is recessed to receive a bearing 130, and is provided with a peripheral flange 132 which abuts against the axially outer end of the hub 124, and a stud portion 134 which is closely received within the central opening 136 of the corresponding driving wheel 138 so as to center it thereon. A nut 140 threaded on the stud 134 clamps the inner face of the driving wheel 138 against the outer face of the corresponding flange 132. The point of contact of the wheel 138 is thus approximately vertically aligned with the cutting edge 80 so that the cutters will not dig into the ground when the mower moves over an uneven surface. Means are preferably provided for preventing accidental loosening of the nuts 140 comprising a washer 142 interposed between each nut 140 and the outer face of corresponding driving wheel 138, the washer 142 having a pin 144 projecting into a corresponding opening in the wheel 138 and the nut 140 being provided with notches 146 in its periphery into which a finger 148 on the washer 142 may be bent.

An annular flange 150 is formed on the inner wall of each wheel 138 concentric with the opening 136 and relatively closely embraces the peripherally outer surface of the axially outer portion of the hub 124, and a ring 152 of felt or other suitable material is received within a complementary groove within the radially inner face of the flange 150 so as to serve as an oil retainer and form a seal between the flange 150 and the hub 124 to prevent the entrance of dirt and dust or other foreign material through the joint therebetween.

A driving gear 154 is positioned within each gear housing 34—120 and at its center is provided with an axially outwardly projecting sleeve-like hub 156 rotatably received within the bearing 130. The axially outer face of each gear 154 abuts against the axially inner end face of the corresponding hub 124. Each gear 154 is thus rotatably mounted with respect to its corresponding driving wheel 138. A pin 158 is relatively closely but rotatably received within the axially inner end of the gear hub 156 and is provided with a head 160 which overlies the axially inner face of the gear 54. The pin 158 is reduced in diameter as at 161 and its axially outer end is further reduced as at 162 and threaded axially into the stud 128 and is secured against movement therein by means of a pin 164. This construction secures the wheels 138 against axially outward displacement with respect to the gear housings.

In order to drivingly connect the gears 154 with the corresponding driving wheel 138 for positive rotation in one direction while allowing overrunning in the opposite direction, a coil spring 166 is coiled about the reduced portion 161 of each pin 158 and its outer end is anchored against movement in the corresponding wheel hub 128 as indicated in Fig. 4. The diameter of the spring 166 is such that its axially inner end is slightly expanded within the hub 156 of the gear 154 and the direction in which it is wound is such that when the lawn mower is moved forwardly the frictional engagement between the axially inner end of the spring 166 and the inner surface of the spring 166 tends to uncoil the spring 166 and thus causes the spring to be frictionally expanded into locking engagement with the inner surface of the hub 156, thus locking the corresponding wheel 138 in driving engagement to its corresponding gear 154. If the lawn mower is moved in a backward direction the frictional engagement between the axially inner end of each spring 166 and the inner surface of the corresponding gear hub 156 will tend to contract the diameter of the spring 166 in which event the wheel 138 will overrun or free wheel with respect to the gear 154, and thus no driving engagement between each wheel 138 and its corresponding gear 154 will occur. This same overrunning feature will, of course, occur in connection with the inner wheel of the lawn mower when it is being moved over a circular path such as occurs in turning a corner. This form of drive between the driving wheels and the driving gears is not only simple and economical but additionally is substantially noiseless in operation and becomes effective substantially instantaneously regardless of the angular positions of the wheels 138 and their corresponding gears 154, and further provides a resilient clutching effect in connecting the wheels to the cutter reel.

Referring now to Fig. 9, it will be noted that each outer gear housing member 120 is internally formed to provide a shoulder 170 concentric with the axis of the wheel and upon which is rotatably received and piloted a spider member indicated generally at 172 and including a rim portion 174, radially disposed arms 176 and a hub portion 178. The hub portion 178 is rotatably received upon a boss 180 formed centrally on the inner face of the inner gear housing member 34 and projecting axially outwardly with respect to the corresponding driving wheel 138 therefrom. At its lower and rearward side each spider member 172 is provided with a pair of radially outwardly projecting spaced arms 182 between which is received a stub shaft 184. Rotatably received upon the stub shaft 184 between the arms 182 is a gear cluster including gears 186 and 188, the gear cluster being provided with a suitable bushing 199 for the shaft 184. The smaller gear 186 of this gear cluster lies in mesh with the gear 154 previously described, and being of considerably smaller diameter than the gear 154 is adapted to be driven at an increased rate of rotation from the gear 154. The shaft 46 of the cutter reel previously described projects at opposite ends into substantially flush relationship with respect to the outer face of the corresponding side frame member 32, and such projecting ends are each provided with a gear 192 which lies in mesh with the corresponding gear 188. Each gear 192 is provided with a stub shaft section threaded into the corresponding outer end of the shaft 46 in the same manner as will hereinafter be described in connection with Fig. 17, so that when it is desired to employ the mower for edging purposes one driving wheel, corresponding gear 34—120 and parts supported thereby, and gear 192 may be removed. The gears 192 being smaller than the gears 188, are adapted to be driven at a relatively higher rate of angular rotation therefrom and thus the cutter reel is adapted to be driven through the train of gears described at a relatively high rate of rotation with respect to the driving wheels 138.

In view of the fact that the cutter reel is bodily shiftable relative to the axis of the driving wheels 138 in order to adjust the height of cut, it will be apparent that special means must be provided for maintaining the driving engagement between the gear cluster comprising the gears 186 and 188 and the gear 154 bodily fixed with respect to the driving wheels 138 on the one hand and the gears 192 bodily fixed with respect to the shaft 46 for the cutter reel on the other hand. The means for insuring this proper driving engagement is as follows. It will be noted that the stub shafts 184 carrying the gears 186 and 188 are maintained at the proper distance from the axis of the gear 154 by means of the spiders 172 previously described and, accordingly, proper mesh of the gears 186 and the gears 154 is always assured. As best indicated in Fig. 8, the end wall of each gear housing member 34 is cut away to form an opening 200 therein and it is through these openings that the opposite ends of the cutter reel shaft 46 project into the gear housings 34—120. The axially inner end of each of the stub shafts 184 is extended axially inwardly through the corresponding openings 200 and into sliding engagement with a slot 202 formed in the outer face of the corresponding frame side member 32. The slots 202 are of a width to slidably but relatively closely receive the inwardly projecting end of the corresponding stub shaft 184 and are of arcuate formation struck from the axis of the shaft 46 as a center. Thus the shafts 184 are always maintained at a predetermined distance from the axis of the shaft 46, which distance is that necessary for proper meshing engagement of the gears 188 and 192, when the chassis frame is adjusted relative to the driving wheels.

In other words, with the construction thus described, if the chassis frame is shifted relative to the axis of the driving wheels, the spider 172 will maintain the proper meshing engagement between the gears 186 and 154 and the ends of the shafts 184 in being moved by engagement with the walls of the cam slots 202 will maintain the proper meshing engagement between the gears 188 and 192. For instance, referring to Fig. 8, the shafts 46 and 184 and the cam slot 202 are shown in full line in one position of adjustment of the chassis frame, and therefore the cutter reel with respect to the driving wheels, and are shown in dotted lines in a different position of adjustment in which the cutter reel is elevated with respect to the position shown in full line. In such case it will be noted that the cutter reel shaft 46 has moved upwardly in the slot 200 about the axis of the fulcrum roll 20 as has also the slot 202. The shaft 184 during this movement has been moved from the lower end of the slot 202 a sufficient distance toward the upper end thereof to maintain the proper driving engagement between the gears 188 and 192.

With the above described construction the chassis may be pivoted about the axis of the fulcrum roll 20 independently of the driving wheels 138 in order to adjust the height of cut, and proper meshing engagement of the various gears in the train between the cutter reel and the driving wheels assured at all times.

From the foregoing it will be understood that each driving wheel and gear housing together with the gears contained therein and excepting the gear 192 on the corresponding end of the cutter reel shaft 46 only, forms a unitary assembly that may be applied to and removed from the mower assembly simply by application to or removal of the stud 36 and the corresponding adjusting hand nut, which will hereinafter be described, and which is provided for locking each of these units in pivotally adjusted relation with respect to the chassis frame. The gear 192 may also be removed as previously described so as to leave the outer face of the corresponding side frame member 32 entirely free of obstructions in such case. This feature permits ready removal of one of these units when it is desired to use the mower for edging purposes along the side of a building or other object without otherwise affecting its proper functioning.

In order to secure the chassis frame in adjusted position with respect to the driving wheels, the following mechanism is provided. Referring particularly to Figs. 3, 5 and 8, it will be noted that a stud 210 is threaded into each of the gear housing members 34 adjacent the upper edge thereof and projects axially inwardly therefrom in axially parallel relation with respect to the axis of the cutter reel. As indicated in Fig. 8, the corresponding frame side member 34 is provided with a slot 212 through which the corresponding stud 210 projects, the slot 212 being of arcuate formation with the axis of the fulcrum rolls 20 as a center.

Referring particularly to Fig. 2, it will be noted that the inner face of each frame side member 34 surrounding the corresponding slot 212 is slightly raised as at 214 and that this raised portion is provided with a plurality of angularly spaced pointed axially inwardly extending projections 216 arranged in radial relation with respect to the axis of the fulcrum roll 20. Referring now to Figs. 3 and 5, it will be noted that an inwardly opening cup-shaped washer member 218 surrounds each of the studs 210 and each is provided with a pair of outwardly extending tongues 220 which project into the corresponding slot 212 and prevent relative rotation of the washer 218 with respect to the side frame 32. It will also be noted that the bottom of the cup-shaped washer is provided with a pair of diametrically oppositely inwardly struck V portions 222 adapted to fit over any one of the corresponding projections 216. A knurled handle or nut member 224 having a hollow end portion 226 is threaded upon the inner end of each of the studs 210, and the hollow end portion 226 thereof cooperates with the corresponding washer 218 to form a housing within which is received a coil spring 228 maintained under axial compression between the washer 218 and the end wall of the hollow portion 226.

With the above described construction when the nut members 224 are tightened down on their corresponding studs 210 and the portions 222 of the washers 218 receive one of the projections 216 therein, the chassis frame side members 32 and consequently the chassis with the cutter reel is firmly locked against movement with respect to the gear housings 34—120 and consequently the driving wheels 138. If it is desired to adjust the height of cut of the mower, which of course involves bodily shifting the chassis relative to the driving wheels so as to bring the cutter reel at a point higher with respect to the ground, the members 224 are loosened and relative angular movement is manually caused between the chassis and the wheels, the washer members 218 riding up over the projections 216 against the force of the springs 228 until the portions 222 of the washers engage the desired projections 216 corresponding to the desired height of cut, and then the nut members 224 are tightened to lock the various parts in this adjusted position.

The above described means of adjustment may be modified as indicated in Figs. 13 and 14 so as to permit simultaneous adjustment of both wheels relative to the chassis frame, whereas in the construction just described the adjustment is made separately, although this may be desirable under certain circumstances.

As indicated in Figs. 13 and 14, the chassis frame side members are provided with slots 230 corresponding to the slots 212 previously described. Instead of providing studs such as the studs 210 previously described, a rod 232 is extended between opposite gear housing members 34 through the slots 230 and are provided with nuts 234 within each of the gear housings, thus further acting to tie these parts together and make the construction more rigid. The rod 232 is enlarged as at 236 between its ends and the ends of the enlarged portion are threaded and extend into spaced but adjacent relationship with the corresponding frame side members 32. A curved gear rack member 238 is welded or otherwise suitably secured to the axially inner face of each frame side member 32 below the corresponding slot 230 and a gear 240 is keyed to each end of the rod 232 for equal rotation therewith but axially slidable thereon and in mesh with the corresponding gear rack 238. A knurled hand wheel 242 is provided centrally on the shaft 232 and a pin 244 fixes the hand wheel 242 and rod 232 together for equal rotation. With this construction it will be apparent that if the hand wheel 242 is rotated the gears 240 in rotating therewith will cause the gears to roll around the rack 238 and thus cause angular adjustment of the chassis with respect to the driving wheels. In this construction, in order to lock the parts in adjusted position the threaded ends of the enlarged portion of the shaft 232 receive thereon knurled nut members 246. When the desired position of adjustment has been obtained by rotation of the hand wheel 242 the nuts 246 are threaded axially outwardly on the shaft 232 and acting through the corresponding gear 240 act to clamp the side frame members 32 to the corresponding gear housing member 34 axially of the rod 232.

It may be noted at this point that the hand nut 224 in the construction shown in Figs. 1 to 9, inclusive, when adjusted toward the upper end of the slot 212, and the shaft 232 in the construction shown in Figs. 13 and 14 act as stops for the handle 104 when the same is swung upwardly into inoperative position. When the nut 224 is adjusted toward the lower end of the slot 212, the upper edge of the guard 250, to be described in detail later, acts as such stop. When the handle 104 is in such position as indicated in dotted lines in Fig. 2, the center of gravity of the handle is forwardly of its pivotal point of connection with the frame side members 32 and disposed between the lines of contact of the fulcrum rolls 20 and the driving wheels 138 with the ground or other supporting surface so that it will maintain itself in such position. This considerably facilitates storing of the lawn mower in a minimum of space when not in use.

Because of the fact that the cutter reel is positioned further forward than in conventional constructions, it is desirable to provide some means for protecting it against contact with foreign objects. Such a means may take the form of a curved metal plate 250, the lower edge of which is formed into an eye 252 surrounding and frictionally gripping the cross bar 38. Preferably, sufficient friction is exerted between the eye 252 and the cross bar 38 to maintain the guard 250 in any desired manually controlled position of rotation with respect to the axis of the cross bar 38. It may be pivoted forwardly in order to expose the parts therebeneath if it is necessary or desirable to obtain access thereto. The curvature of the guard 250 may generally conform to the curvature of the formed edges of the frame side members 32 in the manner indicated in Fig. 2 or may take any other suitable shape. Not only will the guard member 250 prevent damage to the cutter reel from inadvertent contact with foreign articles, but, more important, it will permit the lawn mower to be moved under the edges of shrubs, bushes, hedges, and the like without endangering the branches or leaves of the same being cut off by the lawn mower. This feature adds to the serviceability of the lawn mower.

In Fig. 10 a modified form of wheel structure is shown, the parts shown in this figure being identical to the parts previously described and bearing the same numbers with the exception of the wheel itself. As indicated in Fig. 10, the body of the wheel is formed from two sheet metal disclike parts 256 and 258, the part 256 being received on the stud portion 134 of the wheel hub member 128 and secured in place in the same manner as the wheel 138 previously described. The inner member 258 is axially spaced from the outer member 256 adjacent its axis and is provided with a central opening which is flanged as at 260 and closely receives the outwardly projecting portion of the hub 124 therein. The members 256 and 258 are brought into contact at a point slightly inwardly spaced from the periphery of the wheel and both members are bent complementary to each other as at 262 at this point so as to nest together and prevent possible shifting of one with respect to the other. A ring 264 of a size to fit into the curved portion 262 on the outer member 256 is provided with a plurality of circumferentially spaced, axially parallel studs 266 thereon, which studs project through both members 256 and 258 and are each provided with a nut 268 on their axially inner ends. By this means the peripheral portions of the members 256 and 258 are securely joined together. The member 258 is provided with an axially bent flange portion 270 of lesser diameter than the maximum diameter of the portion 256 and the marginal portion of this flange 270 is radially outwardly bent as at 272 thereby forming a channel between the portion 272 and the peripheral margin of the member 256. Within this channel a tire member 274 is received and axially clamped against relative movement to the members 256 and 258. The tire member 274 is preferably peripherally serrated in the manner of conventional lawn mower wheels and may be formed of either metallic or non-metallic material as may be deemed most desirable. This construction provides a cheap and efficient wheel and one that is not liable to be easily broken in the same manner as the conventional cast iron wheels.

In Figs. 11 and 12 a modified form of cutter bar construction is shown and which is partially built up of sheet metal. In these figures those parts identical to those previously described are indicated by the same numerals. As indicated in this construction, the arms 280 which correspond to the arms 82 and 86 previously described instead of being formed initially integral with the cutter bar are formed separately therefrom as by forging or casting and the inner sides of the outermost arms are shouldered as at 282. The cutter bar body 284 is in this case formed from sheet metal bent to the same general cross-sectional configuration as the cutter bar 70 indicated in Fig. 2 and the opposed edges of the sheet are brought together adjacent the cutting edge 286 which may be formed from a piece of high speed or other steel of desirable characteristics if desired. In such case the lower sheet metal wall is allowed to project forwardly beyond the upper wall to provide a step for receiving the cutting edge 286. The sheet metal of the body portion 284 is cut out to receive the arms 280 and is located on the shoulders 282 of the end members 280 and suitably welded thereto. A notch 288 is cut out of the central portion of the sheet to permit insertion of the lower end of the central arm 280 which is welded thereto after being inserted in place. In this construction the outer ends of the shaft 72 are fixed against rotation in the side frame members 32 and the arms 280 to which the cutter bar is fixed are rotatable on the shaft 72. This permits the shaft 72 to be employed as an additional tie bar between the frame side members 32 and thus aid in making the chassis more rigid. This form of construction offers another means of providing a more economical structure when built in quantity production.

In Figs. 15 and 16 a modification of the previously described construction is shown for use on cutting greens of golf courses and other like uses. As indicated in this construction, the driving wheels in vertical alignment with the cutter bar are dispensed with and are replaced by two relatively large rollers 290 which trail the fulcrum rolls 20. The rollers 290 are journaled in frame members 292 and 294 disposed at opposite sides of the mower and cooperating to form a gear box between them. The inner members 292 are also journaled on the shaft 22 of the fulcrum roll 20 and project forwardly therefrom as at 296. The same chassis as previously described including the chassis side frame members 32 is employed in this construction and the chassis is angularly adjustable about the axis of the fulcrum roll 20 as in the previously described construction. In order to obtain the angular adjustment of the chassis about the axis of the fulcrum roll 20 in order to vary the height of the cut, the inner members 292 are each provided with an upwardly projecting arm portion 298 through which a bolt 300 projects through the slot 212 in each frame side member 32 and a nut 302 is provided for each bolt 300 for clamping these parts together in adjusted relation. In this case the inner members 292 are each provided with a slot 304 through which the reel shaft 46 projects at opposite ends, the slot 304 being struck from the center of the fulcrum roll 20 so as to permit the desired vertical movement of the cutter reel shaft 46.

In order to effect the drive between the roll 290 and cutter reel shaft 46, gears 305 are secured to opposite ends of the shafts for the rollers 290. The gears 305 mesh with smaller gears 306 forming part of a gear cluster including larger gears 308 suitably journaled within the gear casings 292—294. The gears 308 in turn mesh with smaller gears 310 journaled on the outer end of the fulcrum roll shaft 22 and the gears 310 are formed as part of a cluster including a chain sprocket 312. The outer ends of the cutter reel shaft 46 are each provided with a sprocket 314 and a chain 316 drivingly connects each sprocket 312 with its corresponding sprocket 314. Thus with this construction the chassis frame with the cutter reel may be vertically adjusted without effecting the operability of the drive between the rolls 290 and the cutter reel in any respect whatever. The handle 104 in this case instead of being secured to the chassis frame side members 32 may be secured in a similar manner to the inner housings 292. A suitable stop member such as 320 may be provided on each housing member 292 for engagement with the handle 104 in order to prevent it from pivoting downwardly about its pivotal connection with the members 292 to a point lower than that desired. The construction otherwise is identical to that previously shown and described, the main difference being that in this case the driving rolls 290 are of a length to be within the length of the cutter reel and follows the cutter reel so as to roll over grass that has previously been cut and thus does not endanger the bedding down of the grass before it has been cut.

In Fig. 17 a modified form of construction for the cutter reel is shown and is formed primarily from sheet metal parts and tubing, and this figure also indicates a modified form of mounting means for the cutter reel. In this figure the frame side members are illustrated at 330 and as being formed of sheet metal. Each frame side member 330 and inwardly projecting sleeve 332 is secured by welding, the sleeve 332 being so formed as to be initially piloted on and accurately located in position with respect to the corresponding frame side member 330. Each sleeve 332 is internally provided with a bushing 334 for rotatably supporting the corresponding reduced end 336 of the cutter reel shaft 338 which projects therethrough. The cutter reel itself is provided with an elongated and continuous hub portion 340 formed from tubing and the ends of which telescope over the corresponding sleeve 332. The sleeves 332 are preferably formed from a suitable hard or wear-resisting material and each end of the hub portion 340 is internally provided with a bushing 342 fixed therein which closely receives the corresponding sleeve 332 therein for relative rotation with respect thereto. The spiders 344 formed of sheet metal are secured at intervals along the length of the hub portion 340 and the cutter blades 346 are secured to suitable lugs 348 formed on the outer end thereof. A hardened washer 350 is pressed into the left hand end of the hub portion 340 as viewed in Fig. 17 against a shoulder 352 suitably formed therein. A cam member 354 is positioned within the same end of the hub portion 340 and secured against rotation to the inner end of the corresponding sleeve member 332, and a ball 356 is positioned between the cam member 342 and washer 352 to effect longitudinal reciprocation of the cutter reel during rotation thereof in the same manner as in the first described construction.

Within the opposite end of the hub portion 340 a ring 358 is pressed in surrounding relation with respect to the shaft 338. This ring member is provided with a key-way 360 in which a key 362 fixed to the shaft 338 is adapted to be slidably received so as to insure equal rotation of the shaft 338 with the cutter reel and yet provide the longitudinal reciprocation of the cutter reel as caused by the ball 356 and cam 354. A spring 364 maintained under a relatively light compression between the shoulder 366 on the interior of the right hand sleeve member 332 and the ring 358 constantly urges the cutter reel to the left as viewed in Fig. 17 so as to maintain the cutter reel in this position when the axially directed torque on the cutter reel caused by a grass cutting operation is not effective. It will be noted that in this construction the cutter reel is rotatably supported on the side frame members 330 independently of the shaft 338 and, in view of the fact that the bearings for rotatably supporting the cutter reel are of relatively large diameter and will wear but slightly during operation, it will be a relatively simple matter to maintain the proper relation between the cutter blades and the cutter bar for best cutting conditions.

Fig. 17 also illustrates the method preferably employed in all of the previously described constructions for securing the gears to the ends of the cutter reel driving shaft. As illustrated at the left hand end of the view in Fig. 17 the reduced end 336 of the shaft 338 terminates in substantially flush relation with respect to the outer face of the side frame member 330. The gear 335 is provided with a stub shaft portion 337 terminating in a stud 339 which is threaded into the outer end face of the reduced end 336 of the shaft 338, the stud 339 being smaller in diameter than the stub shaft portion 337 so as to form a shoulder for abutment with the outer end face of the end 336. The studs 339 at opposite ends of the shaft 338 are provided with threads of opposite hand so that the driving effort transmitted from the gears 335 to the shaft 338 keeps the studs 339 threaded fully into place. This construction, as previously explained, allows the outer face of either side frame members to be completely cleared of obstructions when it is desired to employ the mower for edging purposes.

In Figs. 18 and 19 a modified form of construction is shown which is similar to the construction illustrated in Figs. 1 to 14, inclusive, except that a chain drive is employed instead of a gear drive. While the use of a chain drive does not permit as high a driving ratio between the driving wheels and the cutter reel as in the gear type of drive previously disclosed, nevertheless it provides an extremely efficient construction and one that is considerably cheaper to manufacture.

Referring now to Figs. 18 and 19, the fulcrum roll is illustrated at 370, the side frame members at 372 and the driving wheels at 374. The casing for the chain, corresponding to the gear box in the first described construction, comprises parts 376 and 378. The side frame member 372 is connected to the shaft 379 for fulcrum roll 370 in substantially the same manner as first described, that is by a nut 380 threaded on the reduced end thereof and likewise the chain housing 376, 378 is pivotally secured to the shaft 379 by a shouldered stud 381, in a manner substantially the same as first described in connection with the gear box 34—120. The housing member 376 is formed to provide an outwardly projecting internally bushed hub portion 382 within which is rotatably received a wheel hub member 384 outwardly flanged at its inner end for engagement with the inner face of the housing member 376 and provided with a nut 386 on its outer end for securing the wheels 374 thereto. The wheel 374 is preferably provided with an inwardly projecting ring-like flange 387 internally bushed for bearing upon the outer circumference of the hub 382. A large sprocket 388 is secured to the hub member 384 within the chain housing. Rotatably supported upon the stud 380 in alignment with the axis of the fulcrum roll 370 are a pair of sprockets 390 and 392, respectively, the opposed ends of the hubs of these sprockets being provided with cooperating lugs and notches 394 for releasably connecting them together in driving relation. A chain 396 operatively connects the sprocket 388 and the sprocket 390.

In this modification the outer ends of the cutter reel shaft 397 rotatably support thereon a sprocket 398 which is drivingly connected with the shaft 397 through a ratchet clutch member including a sliding blade 400 which permits driving of the cutter reel assembly indicated generally at 402 in one direction of rotation only. A chain 404 drivingly connects the sprockets 392 and 398. The outer end of the shaft 396 and the hub of the sprocket 398 which forms a part of the ratchet mechanism between the sprocket 398 and shaft 396 projects through the plate 378 forming the inner member of the chain housing and, as illustrated in Fig. 18, the plate 378 is cut out as at 406 to provide the necessary clearance for these parts, for the hub of the sprocket 392 and for the chain 404 when the frame side members 372 are pivoted about the axis of the fulcrum roll 370 with respect to the chain housing 376—378 in order to adjust the height of cut. Suitable locking means which may take the form of a bolt 408 fixed with respect to the plate 378 and projecting inwardly through a slot 410 in each frame side member 372 and provided with a nut member 412 may be provided for securing the chassis and chain housing in pivotally adjusted position.

As will be apparent with the above described construction any pivotal movement between the chassis including the frame side members 372 and the chain housings 376—378 in order to vary the height of cut, and which pivotal movement takes place about the axis of the fulcrum roll 370 on which axis the sprockets 390 and 392 rotate, will not affect the proper driving relation between the various sprockets and their chains. With this construction, as in the case of the construction first described, one wheel and its chain housing may be removed when it is desired to employ the mower for edging purposes and the mower may be operated with the one driving wheel without materially affecting its operation otherwise.

Fig. 19 also illustrates a modification of the previously described constructions, which may be incorporated therein if desired, which eliminates the axial reciprocation of the cutter reel. The member 414, which is in the form of a flat or suitably grooved washer, replaces the cam members 60 or 356 of the previously described constructions, and instead of employing a single ball 62 or 356, a plurality of balls 416 are positioned between the member 414 and the member 418, which corresponds to the members 58 and 350 previously described, thus providing a ball thrust bearing. This bearing is placed at that end of the mower which resists the axial thrust on the cutter reel caused by the cutting of the grass by the helically arranged cutting blades of the cutter reel 402. In view of the fact that the greatest amount of frictional resistance to operation of the mower in conventional constructions is occasioned by such thrust of the cutter reel, it will be apparent that the above described construction will aid considerably in enhancing the ease of operation of the mower.

From the above description it will be apparent that, particularly with the construction in Figs. 1 to 14, inclusive and 18 and 19 because of the fact that the cutting edge of the cutter bar lies in approximately the same vertical plane as the axes of the driving wheels, the mower is capable of cutting at a uniform height regardless of the contour of the surface in the direction in which the mower is being operated and consequently no scalping of the turf will occur as in conventional lawn mower constructions. Furthermore, by removing one of the driving wheel units, which may be easily and quickly accomplished by removing the corresponding stud 36 and hand nut 224, and removing the corresponding gear 192 or 335 as previously described, the mower may be run along close to the side of a building, hedges, shrubbery or the like in much the same manner as an edging mower. In such a case the mower will be supported by the other driving wheel and the fulcrum rolls 20 and these will support the mower in proper position particularly in view of the rigid construction of the chassis. In other words, the rigidity of the construction is such that even with one wheel removed the mower will be operative to cut the grass at a uniform height over the full length of the cutter bar.

It will also be apparent that in all the constructions shown and described the height of cut may be easily and quickly adjusted and that in the construction illustrated in Figs. 1 to 14, inclusive, and Figs. 18 and 19 in adjusting for the height of the cut the approximately vertically aligned relation of the cutting edge of the cutter bar and the point of contact of the driving wheels and the ground is substantially unchanged so that the feature of eliminating the possiblity of scuffing the turf is present regardless of the adjustment for height of cut. Also that the particular means provided for adjusting the clearance between the cutter bar and the cutting reel provides a quick and convenient method of adjusting such clearance simultaneously over the full length of the cutter bar, and the reciprocating movement of the cutter reel in the direction of its axis during operation insures a maximum life of the sharpness of the mower and maintenance of a more perfect cutting action.

It will be further understood that inasmuch as the chassis and the wheel and drive assemblies may be formed as sub-assemblies during manufacture, the construction as a whole lends itself to ease and economy in assembly. While the various parts of the mechanism have for the most part been shown as of cast construction, it will be apparent that it would be within the skill of the ordinary workman versed in the art of forming sheet metal parts to form many of the parts herein shown as of cast construction from sheet metal, so that in quantity production the cost of the device might be considerably reduced thereby.

Formal changes may be made in the specific embodiment of the invention described without departing from the spirit and substance of the broad invention, the scope of which is commensurate with the appended claims.

What I claim is:—

1. In a lawn mower, in combination, a fulcrum roll, a driving wheel, a chassis, a cutter reel and a cutter bar carried by said chassis, said driving wheel and said chassis being independently pivotable with respect to each other about the axis of said fulcrum roll, and means drivingly connecting said wheel and said cutter reel.

2. In a lawn mower, in combination, a fulcrum roll, a driving wheel, means including a gear box operatively connecting said driving wheel with respect to said fulcrum roll, a chassis frame pivotable with respect to said means about the axis of said fulcrum roll, a cutter reel and a cutter bar carried by said chassis frame, and means including gearing within said gear box operatively connecting said driving wheel and cutter reel for inter-related movement.

3. In a lawn mower, in combination, a chassis frame, driving wheels bodily shiftable with respect thereto, a cutter reel and a cutter bar mounted in said chassis frame, a gear for driving said cutter reel arranged for equal shifting movement therewith, a gear bodily movable with said driving wheel with respect to said chassis frame, gearing connecting the first two mentioned gears, and means for maintaining said gearing in meshing relationship with said two first mentioned gears during bodily shiftable movement between said driving wheel and said chassis frame.

4. In a lawn mower, in combination, a fulcrum roll, a chassis frame, a cutter reel and a cutter bar supported by said chassis frame, a driving wheel, means interposed between said driving wheel and said fulcrum roll for maintaining them in spaced relation, means pivotally associated with respect to the first mentioned means and connected with said chassis frame permitting independent pivotal movement between said chassis frame and said driving wheel to vary the height of cut of said mower, and means for securing said means in pivotally adjusted relationship with respect to each other.

5. In a lawn mower, in combination, a pair of side frame members, means interconnecting said members, a cutter reel and a cutter bar carried between said members, a fulcrum roll rotatably mounted between said members, an element associated with each end of said fulcrum roll for pivotal movement with respect to the axis thereof independently of said frame side members, a driving wheel carried by each of said elements, and means interconnecting said driving wheels and said cutter reel.

6. In a lawn mower, in combination, a cutter reel, means for rotating said cutter reel, and means for automatically effecting axial reciprocation of said cutter reel during rotation thereof.

7. In a lawn mower, in combination, a frame, a cutter reel, a cutter bar operatively associated with said reel, means for rotating said cutter reel, and means co-acting between said reel and frame so constructed and arranged as to cause said cutter reel to reciprocate longitudinally of said cutter bar during and by reason of rotation of said reel.

8. In a lawn mower, in combination, a supporting frame, a cutter reel rotatably and axially movably supported by said frame, means for driving said cutter reel, and means cooperating between said frame and said cutter reel for effecting axial reciprocation of said cutter reel in normally timed relation to the rotation thereof during and by reason of rotation thereof.

9. In a lawn mower, in combination, a supporting frame, a cutter reel rotatably and axially slidably supported by said frame, means for rotating said cutter reel, and cam means cooperating between said cutter reel and said frame for effecting axial movement of said cutter reel during and by reason of rotation thereof.

10. In a lawn mower, in combination, a supporting frame, a cutter reel rotatably and axially slidably supported by said frame, means for rotating said cutter reel, means for positively moving said cutter reel in one axial direction during and by reason of rotation thereof, and yieldable means for moving said cutter reel in the opposite axial direction during rotation thereof.

11. In a lawn mower, in combination, a supporting frame, a cutter reel rotatably and axially slidably supported by said frame, means interconnected between said cutter reel and said frame intermittently and positively moving said cutter reel in one direction axially thereof during and by reason of rotation thereof and spring means opposing the action of the first mentioned means.

12. In a lawn mower, in combination, a supporting frame member, a cutter reel member rotatably and axially slidably supported by said frame, cam means interposed between an axial face of said cutter reel member and said frame member, and a rolling anti-friction means interposed between said cam means and one of said members.

13. In a lawn mower, in combination, a supporting frame having a hub, a cutter reel rotatably and axially slidably supported by said frame, means for rotating said cutter reel, a recessed hub portion on said cutter reel receiving an end of said hub on said frame, a cam member fixed to one of said hubs within said recessed hub, and a ball interposed between said cam member and an axially directed face of the other of said hubs, and spring means constantly urging said cutter reel in one direction of movement axially thereof.

14. In a lawn mower, in combination, a chassis frame, a cutter reel rotatably supported thereby, a gear for driving said cutter reel and secured to the shaft thereof, a wheel support pivotally mounted with respect to said chassis frame, a wheel rotatably supported by said wheel support, a gear carried by said wheel support and driven by said wheel, a spider member rotatably mounted on said wheel support, and a gear cluster rotatably mounted on said spider member and including two gears one of which is in mesh with said gear driven by said wheel and the other of which lies in mesh with said gear on said cutter reel shaft.

15. In a lawn mower, in combination, a chassis frame, a cutter reel rotatably supported thereby, a gear for driving said cutter reel and secured to the shaft thereof, a wheel support pivotally mounted with respect to said chassis frame, a wheel rotatably supported by said wheel support, a gear carried by said wheel support and driven by said wheel, a spider member rotatably mounted on said wheel support, a gear cluster rotatably mounted in said spider member and including two gears one of which is in mesh with said gear driven by said wheel and the other of which lies in mesh with said gear on said cutter reel shaft, and cam means for controlling the rotational position of said spider with respect to said wheel support during relative pivotal movement between said chassis frame and said wheel support.

16. In a lawn mower, in combination, a chassis frame, a hollow wheel support forming a gear box pivotally mounted with respect to said chassis frame, a wheel rotatably supported by said wheel support, a gear within said wheel support concentric with said wheel and driven therefrom, a gear within said wheel support concentric with said cutter reel and secured relative thereto for equal rotational movement therewith, a spider member within said wheel support rotatably mounted with respect to the axis thereof, a pin carried by said spider member in axially parallel but spaced relation with respect to the axis of said wheel, a gear cluster comprising a pair of gears rotatably mounted on said pin, one gear of said gear cluster meshing with said gear driven by said wheel and the other gear of said gear cluster meshing with said gear fixed with respect to said cutter reel, said chassis having a cam surface formed thereon, and said pin projecting through said gear housing and into operative engagement with said cam surface whereby to be guided thereby during relative pivotal movement between said chassis frame and said wheel support.

17. In a lawn mower, in combination, a chassis frame, a cutter reel and a cutter bar carried by said frame, a wheel support pivotally mounted with respect to said frame at either end thereof, a wheel carried by each of said wheel supports in such relation to the pivotal axis thereof that the axes of said wheels and cutter reel are in approximately the same vertical plane when adjusted to at least one normal cutting position, means drivingly connecting each of said wheels to the corresponding end of said cutter reel, and means co-acting between each of said wheel supports and said frame so constructed and arranged as to permit the pivotal relationship of one of said wheel supports with respect to said frame to be adjusted independently of the other thereof.

18. In a lawn mower, in combination, a chassis frame, a cutter reel and a cutter bar carried by said frame, a wheel support pivotally mounted with respect to said frame at either end thereof, a wheel carried by each of said wheel supports, means drivingly connecting each of said wheels to the corresponding end of said cutter reel, and means interconnected between said frame and both of said wheel supports for effecting simultaneous pivotal adjustment of said wheel supports with respect to said frame.

19. In a lawn mower, in combination, a chassis frame, a cutter reel and a cutter bar carried by said frame, a wheel support pivotally mounted with respect to said frame at either end thereof, a wheel carried by each of said wheel supports, means drivingly connecting each of said wheels to the corresponding end of said cutter reel, and means interconnected between said frame and both of said wheel supports for effecting simultaneous pivotal adjustment of said wheel supports with respect to said frame comprising racks on said frame, a rotatable shaft interconnecting said wheel supports, and gears rotatable with said shaft and lying in mesh with said racks.

20. In a lawn mower, in combination, a chassis frame, a cutter reel and a cutter bar carried by said frame, a wheel support pivotally mounted with respect to said frame at either end thereof, a wheel carried by each of said wheel supports, means drivingly connecting each of said wheels to the corresponding end of said cutter reel, and means interconnected between said frame and both of said wheel supports for effecting simultaneous pivotal adjustment of said wheel supports with respect to said frame comprising racks on said frame, a rotatable shaft interconnecting said wheel supports, gears rotatable with said shaft and lying in mesh with said racks, and means cooperating between said shaft and said frame for locking said wheel supports in pivotally adjusted relation with respect to said frame.

21. In a lawn mower, in combination, a chassis frame having side members, a cutter reel and a cutter bar supported by said frame, a fulcrum roll supported between said side members, wheel supports mounted at each end of said frame to pivot about the axis of said fulcrum roll relative to said frame, wheels carried by said wheel supports, means operatively interconnected to said wheels with said cutter reel, said side members each having a slot therethrough having a center approximately coincident with the axis of said fulcrum roll, a screw member anchored to each of said wheel supports and projecting through the corresponding of said slots, and means associated with each of said screw members for clamping said wheel supports to said side members.

22. In a lawn mower, in combination, a chassis frame having side members, a cutter reel and a cutter bar supported by said frame, a fulcrum roll supported between said side members, wheel supports mounted at each end of said frame to pivot about the axis of said fulcrum roll relative to said frame, wheels carried by said wheel supports, means operatively interconnected to said wheels with said cutter reel, said side members each having a slot therethrough having a center approximately coincident with the axis of said fulcrum roll, a stud fixed to each of said wheel supports and projecting through the corresponding of said slots, a plurality of angularly spaced, inwardly extending projections on each of said side members along the margin of the corresponding of said slots, a washer member surrounding each of said studs and having a portion projecting into the corresponding of said slots to prevent rotation of said washer member, each of said washer members having a depression therein adapted for complementary engagement with one of said projections, a nut member threaded on each of said studs and adapted to clamp the corresponding of said washers between it and the corresponding of said side members, and spring means interposed between each of said nut members in the corresponding of said washers.

23. In a lawn mower, in combination, a frame including side members and a rod interconnected between them, a cutter reel rotatably supported by said frame, and a sheet metal guard member pivotally mounted on said rod and movable to forwardly protecting relation with respect to said cutter reel.

24. In a lawn mower, in combination, a chassis frame, a cutter reel and a cutter bar supported thereby, a wheel supporting member pivotally secured at each end of said chassis frame, a wheel rotatably carried by each of said wheel supporting members, means for locking said wheel supports in pivotally adjusted relation with respect to said frame, and a handle pivotally secured to said frame, said handle being so constructed and arranged that when it is moved to its forwardmost position it may engage said means to maintain it in such position.

25. In a lawn mower, in combination, a frame including side members each having an inwardly projecting boss, a shaft extending between and rotatably supported in said bosses, a cutter reel having a hub supported on said shaft, said cutter reel hub being so constructed and arranged that its end portions extend over said bosses in telescoping relation with respect thereto, said hubs each having an internal annual groove therein and a resilient sealing element received in said groove and bearing on the corresponding of said bosses.

26. In a lawn mower, in combination, a frame having side members, a cutter reel rotatably mounted between said side members, a cutter bar pivotally mounted between said side members and having a cutting edge operatively associated with cutter reel, a rod extending between said side members above said cutter bar, a plurality of cam members fixed to said rod, arms fixed to said cutter bar and extending into cooperative relation with respect to said cam members and cooperating therewith whereby rotation of said rod and cam effects pivotal movement of said cutter bar.

27. In a lawn mower, in combination, a frame having a pair of side members, a cutter reel rotatably mounted between said side members, a cutter bar pivotally mounted between said side members and having a cutting edge cooperable with said cutter reel, a plurality of upwardly extending arms fixed to said cutter bar, the upper ends of said arms having openings therein aligned with each other, a rod extending between and rotatably received by said side members and extending through said openings, a cam member fixed to said rod within each of said openings, and compression means extending between said arms and including axially adjustable means for causing certain of said arms to be clamped against said side members.

28. A cutter bar for lawn mowers and the like including, in combination, a shaft, a sheet metal housing inclosing said shaft, edge portions of opposite walls of said housing contacting each other in offset relation to form a step, and a hard metal cutting edge received in said step and secured to said housing.

29. A wheel for lawn mowers or the like including a body portion formed to provide two disc-like sheet metal parts axially spaced from one another adjacent their centers and contacting one another adjacent their periphery, the peripheral margins of said members cooperating to form a channel between them, a serrated rim received and axially clamped in said channel, and means for maintaining said portions in rim-clamping relation.

30. A driving wheel for lawn mowers and the like including a body portion formed of a pair of sheet metal disc-like parts axially spaced from each other adjacent their centers and contacting one another adjacent their peripheries, the peripheral portions of said parts being constructed and arranged to form a channel between them, a serrated rim received in and axially clamped in said channel, said parts being complementarily formed to provide a circular depression therein concentric with the axis thereof, a ring seated in said depression, studs fixed to said ring and projecting through said parts, and nuts threaded on said studs and clamping said parts together in assembled relationship.

31. In a lawn mower, in combination, a driving wheel assembly, a member mounted at each end of said assembly and projecting forwardly therefrom, a fulcrum roll extending between said members in advance of said driving wheel assembly, a chassis frame including side frame members, a cutter reel and a cutter bar supported between said side frame members, said chassis frame pivotally mounted with respect to the first mentioned members in advance of said fulcrum roll and about the axis of said fulcrum roll, means for securing said chassis frame in pivotally adjusted relation with respect to said first mentioned members, and means operatively connecting said driving wheel assembly and said cutter reel.

32. In a lawn mower, in combination, a driving wheel assembly, means rotatable relative to said driving wheel assembly secured to each side thereof and projecting forwardly therefrom, a fulcrum roll rotatably mounted between said means in advance of said driving wheel assembly, a chassis frame including side members, a cutter reel and a cutter bar supported between said side members in advance of said fulcrum roll, said chassis frame being pivotable about the axis of said fulcrum roll relative to said means, means for locking said chassis frame to the first mentioned means in pivotally adjusted relation with respect thereto, a gear and a sprocket fixed to each other and rotatably mounted at each end of said fulcrum roll in concentric relation thereto, gearing drivingly connecting each of said gears and said driving wheel assembly, and a chain drivingly connecting each of said sprockets and said cutter reel.

33. In a lawn mower, in combination, a chassis frame, a cutter reel and a cutter bar supported by said chassis frame, a driving wheel, a member rotatably mounted with respect to said wheel and pivotally secured to said chassis in eccentric relation to said wheel, and means drivingly connecting said driving wheel and said cutter reel including parts supported by said member, said driving wheel, member and parts forming a unitary assemblage applicable to and removable from said lawn mower as such.

34. In a lawn mower, in combination, a chassis frame, a cutter reel and a cutter bar supported by said chassis frame, a housing, means pivotally securing said housing to said chassis frame, a drive wheel rotatably mounted on said housing in eccentric relation with respect to the point of pivotal connection thereof with said chassis frame, and means for drivingly connecting said driving wheel and said cutter reel including parts supported by and within said housing, said housing, wheel and parts constituting a unitary assembly removable as such from said mower upon removal of the first mentioned means.

35. In a lawn mower, in combination, a chassis frame, a cutter reel and a cutter bar supported by said chassis frame, a member pivotally mounted with respect to said chassis frame, a drive wheel rotatably supported on said member in eccentric relation with respect to the line of pivot of said member with respect to said chassis frame, a sprocket on said drive wheel, a sprocket on said cutter reel, and a pair of sprockets arranged in driving relation with respect to each other for rotation about the line of pivot of said member with respect to said chassis frame, and chains drivingly connecting said sprocket on said wheel with one of said pair of sprockets and a chain connecting said sprocket on said cutter reel with the other of said pair of sprockets.

36. In a lawn mower, in combination, a pair of spaced frame side members, means rigidly connecting said frame side members, a drive shaft extending between and rotatably supported by said frame side members, and a cutter reel having a hollow axially continuous hub portion surrounding said shaft and drivingly connected thereto.

37. In a lawn mower, in combination, a pair of spaced frame side members, means rigidly connecting said frame side members, a drive shaft extending between and rotatably supported by said frame side members, a cutter reel having a hollow axially continuous hub portion surrounding said shaft and drivingly connected thereto, and means for supporting said cutter reel on said frame side members independently of said shaft.

38. In a lawn mower, in combination, a pair of spaced frame side members, means rigidly connecting said members together, a sleeve member secured to and projecting inwardly from each frame side member, said sleeve members being arranged in concentric relation with respect to each other, a shaft extending between and rotatably supported at opposite ends within said sleeve members, a cutter reel, a hollow hub member for said cutter reel extending between said sleeve and rotatably supported upon the exterior thereof, and means drivingly connecting said cutter reel and said shaft.

39. In a lawn mower, in combination, a pair of spaced frame side members, a cutter reel rotatably supported between said side members, a shaft extending between and supported by said side members, a cutter bar surrounding and supported by said shaft in operative relation with respect to said reel and movable with respect to the axial line of said shaft for adjusting purposes, and means for locking said cutter bar in adjusted relation with respect to said reel.

40. In a lawn mower, in combination, a pair of spaced frame side members, a cutter reel rotatably supported between said side members, a shaft extending between and rotatably supported by said side members, a cutter bar fixed to said shaft in cooperative relation with respect to said reel, and means for locking said shaft and cutter bar in rotatably adjusted position.

41. In a lawn mower, in combination, a pair of spaced frame side members, a cutter reel rotatably supported between said side members, a shaft extending between and supported by said side members and fixed to said side members whereby to form a tie bar therebetween, a cutter bar surrounding and rotatably supported on said shaft in cooperative relation with respect to said reel, and means for locking said cutter bar in rotatably adjusted position on said shaft.

42. In a lawn mower driving mechanism, in combination, a pair of members pivotally secured together, a rotatable element carried by each of said members in eccentric relation with respect to the line of pivot between them, a gear drivingly secured in concentric relation with each of said elements, a pair of gears drivingly connected together in concentric relation and in meshing relation with respect to the first two mentioned gears and rotatable about a line eccentric to both said elements and said line of pivot, and means for maintaining the meshing relationship between said gears upon pivotal movement between said members.

43. In a lawn mower driving mechanism, in combination, a pair of members pivotally mounted with respect to each other, a rotatable element carried by each of said members in eccentric relation with respect to the line of pivot between them, a gear drivingly connected to each of said rotatable elements in concentric relation with respect thereto, a gear cluster including a pair of gears in meshing relationship with respect to the first mentioned pair of gears and rotatably mounted in eccentric relation with respect to the first mentioned gears and with respect to the line of pivot between said members, supporting means pivotally mounted with respect to one of said members for pivotally supporting said gear cluster for bodily shiftable movement about the axis of said gear connected to one of said members, guiding means on the other of said members, and means associated with said gear cluster engageable with said guiding means for controlling the pivotal relation of said gear cluster support with respect to the first mentioned member.

44. In a lawn mower, in combination, a fulcrum roll, a pair of driving wheels, means including a gear box operatively connecting said wheels to said roll, a chassis frame pivotally connected to said means for pivotal movement about the axis of said roll, means for locking said frame in pivotally adjusted relation, a gear within each of said boxes concentric with the corresponding of said wheels, a hollow hub on each of said gears, a central pin on each of said wheels projecting into the corresponding hub, a coil spring between each said pin and hub forming a one way drive between them, a cutter reel shaft rotatably supported in said frame, means operatively connecting said gears and said shaft regardless of the pivotal relation of said means and said frame, a cutter reel about said shaft and drivingly connected thereto, means for effecting axial reciprocating movements of said reel with respect to said frame during rotation of said reel, a second shaft extending between opposite sides of said frame, a cutter bar supported at a plurality of axially spaced points on said shaft for movement about the axis thereof, the cutting edge of said bar being stepped and provided with an alloy cutting edge member brazed thereto, arm means fixed with respect to said bar projecting therefrom, a third shaft pivotally supported by said frame, cam means fixed with respect to said third shaft and cooperating with said arms to control the pivotal position of said cutter bar, a guard member pivotally mounted on said frame in normally protective relation with respect to the forward face of said reel, and handle means pivotally connected to said frame, and stop means on said frame engageable with said handle means to hold said handle means in vertically directed relation during inoperative periods of said mower.

HENRY C. LIMBACH.